(12) United States Patent
Huang et al.

(10) Patent No.: US 10,417,083 B2
(45) Date of Patent: Sep. 17, 2019

(54) LABEL RECTIFICATION AND CLASSIFICATION/PREDICTION FOR MULTIVARIATE TIME SERIES DATA

(71) Applicant: General Electric Company, Schenectady, NY (US)

(72) Inventors: Hao Huang, San Ramon, CA (US); Xiaoqian Wang, Pittsburgh, PA (US)

(73) Assignee: General Electric Company, Schenectady, NY (US)

( * ) Notice: Subject to any disclaimer, the term of this patent is extended or adjusted under 35 U.S.C. 154(b) by 111 days.

(21) Appl. No.: 15/827,559

(22) Filed: Nov. 30, 2017

(65) Prior Publication Data

US 2019/0163549 A1 May 30, 2019

(51) Int. Cl.
*G06F 11/07* (2006.01)
*G06N 20/00* (2019.01)

(52) U.S. Cl.
CPC ........ *G06F 11/079* (2013.01); *G06F 11/0721* (2013.01); *G06N 20/00* (2019.01)

(58) Field of Classification Search
CPC ..... G06F 11/07; G06F 11/079; G06F 11/0721
USPC .......................................................... 714/37
See application file for complete search history.

(56) References Cited

U.S. PATENT DOCUMENTS

| 7,716,011 | B2 | 5/2010 | Thibaux et al. | |
| 7,814,034 | B2 * | 10/2010 | Eklund | G05B 23/0229 |
| | | | | 706/14 |
| 8,825,567 | B2 | 9/2014 | Jiang et al. | |
| 9,075,713 | B2 | 7/2015 | Jones et al. | |
| 9,244,887 | B2 | 1/2016 | Leonard et al. | |
| 9,904,740 | B1 * | 2/2018 | Ni | G06F 16/9024 |
| 9,984,334 | B2 * | 5/2018 | Nikovski | G06N 20/00 |
| 2003/0212839 | A1 * | 11/2003 | Sethi | G06F 13/28 |
| | | | | 710/22 |
| 2007/0299798 | A1 * | 12/2007 | Suyama | G06F 17/18 |
| | | | | 706/21 |

(Continued)

OTHER PUBLICATIONS

Scholkopf et al., "Estimating the support of a high-dimensional distribution", Neural Computation vol. 13, Issue: 7, pp. 1443-1471, Jul. 2001, 29 pp.

(Continued)

*Primary Examiner* — Kamini B Patel
(74) *Attorney, Agent, or Firm* — Buckley, Maschoff & Talwalkar, LLC (57) ABSTRACT

A method of directional label rectification with adaptive graph for multivariate time-series data includes obtaining an input matrix containing sensor data and a first event matrix containing event data, identifying in the input matrix at least one feature pattern and a first corresponding time stamp, identifying in the first event matrix at least one fault signature and a second corresponding time stamp, if both a label matrix and an affinity matrix are known, then optimizing a weight matrix, else if both the label matrix and the weight matrix are known, then optimizing the affinity matrix, else optimizing the label matrix, creating a dynamically rectified event matrix by applying the label matrix, the affinity matrix, and the weight matrix to the first event matrix; and applying the dynamically rectified event matrix to forecast a future status of the asset. A system and computer-readable medium are disclosed.

15 Claims, 4 Drawing Sheets

(56) References Cited

U.S. PATENT DOCUMENTS

| | | | | |
|---|---|---|---|---|
| 2011/0314367 | A1* | 12/2011 | Chang | G06F 16/437 715/230 |
| 2012/0030020 | A1* | 2/2012 | Bucak | G06Q 30/02 705/14.53 |
| 2012/0041920 | A1* | 2/2012 | Kim | G06N 7/005 706/52 |
| 2012/0089552 | A1* | 4/2012 | Chang | G06N 5/02 706/52 |
| 2015/0219530 | A1* | 8/2015 | Li | G05B 23/0243 702/181 |
| 2015/0235139 | A1* | 8/2015 | Sharma | G06N 5/003 706/58 |
| 2016/0055494 | A1* | 2/2016 | Ni | G06Q 30/0202 705/7.31 |
| 2016/0299938 | A1* | 10/2016 | Malhotra | G06F 17/18 |
| 2017/0140244 | A1* | 5/2017 | Sharma | G06K 9/6212 |
| 2017/0144378 | A1* | 5/2017 | Giera | G05B 13/0265 |
| 2017/0154282 | A1 | 6/2017 | Rossi et al. | |
| 2017/0220938 | A1 | 8/2017 | Sainani et al. | |
| 2017/0308505 | A1* | 10/2017 | Ni | G06F 17/14 |

OTHER PUBLICATIONS

Guyon et al., "Gene selection for cancer classification using support vector machines", Machine Learning, vol. 46, Issue: 1-3, pp. 389-422, Jan. 2002, 34 pp.

Zhu et al., "Semi-supervised learning using gaussian fields and harmonic functions", School of Computer Science, pp. 912-919, Aug. 21-24, 2003, 8 pp.

Bezdek "Convergence of alternating optimization", Neural Parallel Sci, pp. 351-368, Dec. 2003, 20 pp.

Yoon et al., "Feature subset selection and feature ranking for multivariate time series", IEEE Transactions on Knowledge and Date Engineering, vol. 17, Issue: 9, pp. 1186-1198, Sep. 2005, 13 pp.

Yoon et al., "Feature subset selection on multivariate time series with extremely large spatial features", Sixth IEEE International Conference on Data Mining, 2006, 6 pp.

Cheng et al., "A Robust Graph-Based Algorithm for Detection and Characterization of Anomalies in Noisy Multivariate Time Series", 2008 IEEE International Conference on Data Mining Workshops, pp. 349-358, Pisa, Dec. 15-19, 2008, 10 pp.

Wang et al., "Graph transduction via alternating minimization", Proceeding of the 25th International Conference on Machine Learning, pp. 1144-1151, 2008, 8 pp.

Liu et al., "Multitask feature learning via efficient '2;1-norm minimization", pp. 339-348, Jun. 18-21, 2009, 10 pp.

Chandola et al., "Anomaly detection A survey", ACM Computing Surveys, pp. 1-15, Sep. 2009, 72 pp.

Nie et al., "Efficient and robust feature selection via joint '2;1-norms minimization", pp. 1813-1821, Jan. 2010, 10 pp.

Nie et al., "A general graph-based semi-supervised learning with novel class discovery", Neural Computing and Applications, vol. 19, Issue: 4, pp. 549-555, Jun. 2010, 7 pp.

Cai et al., "Unsupervised feature selection for multi-cluster data", In KDD, pp. 333-342, Jul. 25-28, 2010, 11 pp.

He et al., "Coselection of features and instances for unsupervised rare category analysis", Statistical Analysis and Data Mining, pp. 417-430, Sep. 29, 2010, 14 pp.

Mahadevan et al., "Anomaly detection in crowded scenes", IEEE Conference on Computer Vision and Pattern Recognation, pp. 1975-1981, 2010, 7 pp.

Liu et al., "Isolation-based anomaly detection", ACM Transaction on Knowledge Discovery from Data, vol. 6 Issue: 1, pp. 1-3, Mar. 2012, 44 pp.

Zhang et al., "A unified feature and instance selection framework using optimum experimental design", IEEE Transactions on Image Processing, vol. 21, Issue: 5, pp. 2379-2388, May 2012, 10 pp.

Feng et al., "Adaptive unsupervised multi-view feature selection for visual concept recognition" In ACCV, vol. 1, pp. 343-357, 2012, 2 pp.

Tang et al., "Coselect: Feature selection with instance selection for social media data", pp. 695-703, 2013, 9 pp.

Fulcher et al.,"Highly comparative feature-based time-series classification", IEEE Transactions on Image Processing, pp. 3026-3037, May 9, 2014, 20 pp.

Chang et al., "A convex formulation for semi-supervised multilabelFeature selection", In AAAI, pp. 1171-1177, 2014, 7 pp.

Laptev et al., "Announcing a benchmark dataset for time series anomaly detection", 2015, 2 pp.

Wang et al., "Dynamic label propagation for semi-supervised multi-class multi-label classification", vol. 52, pp. 75-84, Apr. 2016, 8 pp.

Cheng et al., "Ranking causal anomalies via temporal and dynamical analysis on vanishing correlations", Aug. 13-17, 2016, 10 pp.

Purushotham et al.,"Recurrent neural networks for multivariateTime series with missing values", pp. 1-14, Nov. 7, 2016, 14 pp.

Jia et al., "Adaptive neighborhood propagation by joint '2;1-norm regularized sparse coding for representation and classification", 2016 IEEE 16th International Conference on Data Mining (ICDM), pp. 201-210, Dec. 12-15, 2016, 10 pp.

Liu et al., "Robust multi-view feature selection", 2016 IEEE 16th International Conference on Data Mining (ICDM), pp. 281-290, Dec. 12-15, 2016, 10 pp.

Zhou et al., "Bi-level rare temporal pattern detection", pp. 719-728, Dec. 12-15, 2016, 10 pp.

* cited by examiner

LABEL RECTIFICATION AND CLASSIFICATION/PREDICTION FOR MULTIVARIATE TIME SERIES DATA

BACKGROUND

With the rapid advances in sensor design, data storage capabilities, and network connectivity for industrial assets, there is an explosive growth in the amount of complex, multivariate time series sensor data available. This data can be used to analyze the failure of an asset.

Failure analytics can be understood as a knowledge discovery process where the output gives the fault signatures related to the failure, while the input corresponds to observed/monitored sensor recording data. For fleet-level analytics, high-frequency sampling rate, large-scale input data is often available. This large quantity of data can include observations from failed industrial assets, but also observations from healthy industrial assets. Typically, the dataset can contain much more observations from healthy industrial equipment.

Figure 1A:
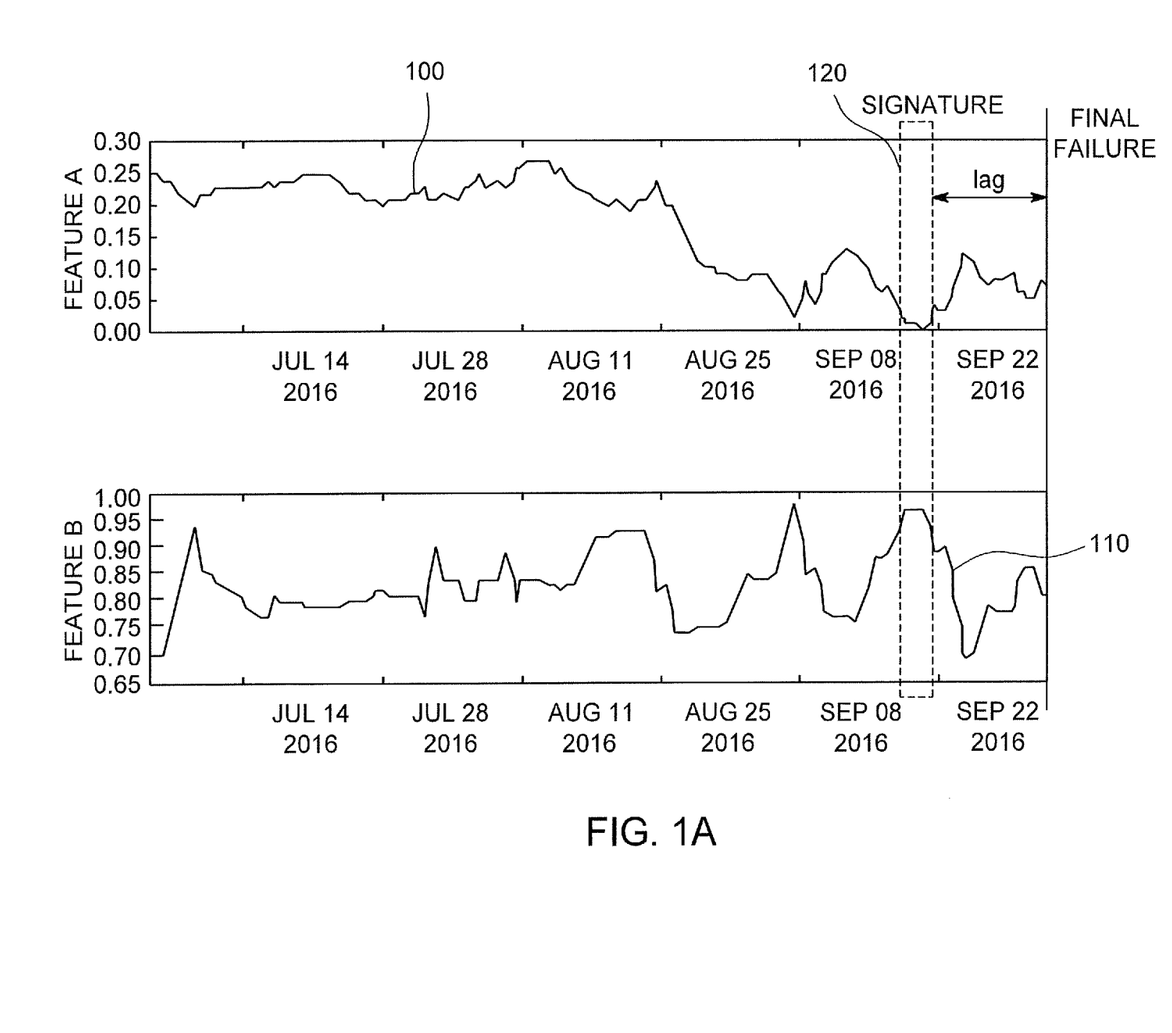
FIGS. 1A-1B depict representative of monitored sensor data for different features of an industrial asset.
Figure 1B:
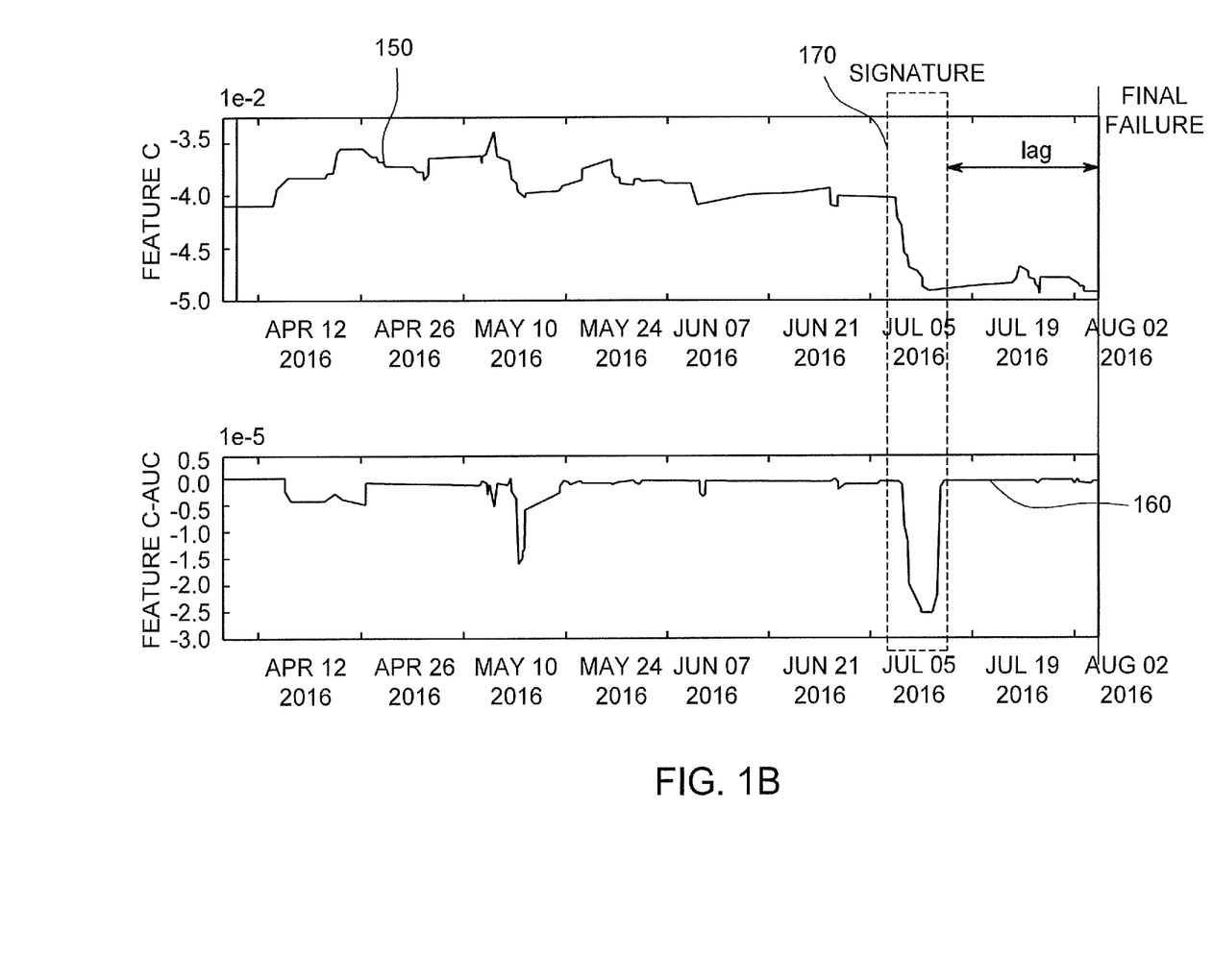

FIGS. 1A-1B depict representative illustrations of monitored sensor data 100, 110, 150 respectively for features A, B, and C of an industrial asset. Fault signatures 120, 170 each have different lead time to failure depending on the monitored feature of the industrial asset. Signature 110 (FIG. 1A) appears fifteen days before final failure and has a duration of two days. FIG. 1A illustrates that the fault causes a small perturbation on the value of feature A; and a large perturbation on the value of feature B. FIG. 1B illustrates signature 160 appearing almost one month before final failure of feature C and lasting for five days. There is a level-shift on feature C, which can be captured by a sliding-window based autocorrelation technique ("auc").

Observable in FIGS. 1A-1B is that a lag (sometimes of significant duration) can exist between occurrence of the fault signature and the final system failure. Also, the time of the signature duration can vary across the type and nature of the industrial asset and the particular feature. In real world industrial problems, such "short" signature and "lag" patterns are usual and could be of different reasons.

A feature monitored by a sensor could be indirectly related to the failure of the industrial asset. For example, an engine failure might happen because an engine component cracks (i.e., the failure's root cause). But due to the complexity of the engine design, an interval of time can elapse prior to the impact of the fault propagating through the whole system and, thus, leading to final failure. Prior to the component cracking, a vibration sensor monitoring that particular component can capture a pattern of strong vibrations. This pattern of vibrations can be viewed as the fault signature. Once the crack happens, this component can become unconnected from the whole system, at which time the component's vibration profile can become (and remain) stable until the final failure. Therefore, the timestamps of the signature might not be adjacent to the final failure—but only present at the time the component cracks.

Because of industrial asset system complexities, this component crack might be one among many possible root causes of a final failure. Under conventional approaches it is extremely difficult for domain experts or existing machine learning techniques to allocate such relevant signatures as the failure's root cause in highly complicated and noisy, multi-asset environments that produce a large quantity of multivariate temporal data streams from a number of sensors monitoring the industrial asset.

Conventional analytics can identify fleet-level fault signatures when related to an identified failure. Such signature should consist of or directly relate to the input sensor weighting, in order to support root cause detection. Besides fleets of industrial assets generate a large volume of data, there are many challenges in identifying failure event signatures. For example, the monitored sensor dataset is multivariate and includes data from multiple industrial assets. Conventional approaches implementing univariate and single-asset analytics single-asset analytics are insufficient to provide accurate analysis. Also, even though the observed event time is known, the time that the fault signatures appears is usually unknown, and could be different across different events/assets. Conventional (semi-) supervised machine learning techniques can provide dubious analytical results from this condition.

DETAILED DESCRIPTION

The terms "operational, healthy, and functional" are used interchangeably regardless of the nature and/or type of industrial asset. Similarly, the terms "nonoperational, unhealthy, and nonfunctional" are used interchangeably regardless of the nature and/or type of industrial asset. It should be readily understood that these terms are not binary states of the monitored industrial asset (e.g., a generator can have reduced efficiency (an unhealthy state) but still provide full power (a healthy state). Thus, an industrial asset can have be unhealthy in one aspect, and yet healthy in another aspect.

A time series is a sequence of measurements indexed in time order. An asset is the data source for the time series—e.g., an equity stock (or other ownership vehicle) in the financial market (where the time series data represents its performance over a time period), or an industrial asset (where the time series data represents monitoring sensor data). An industrial asset can be, among other things and without limitation, a generator, gas turbine, power plant, manufacturing equipment on a production line, aircraft engine, wind turbine generator, locomotive, imaging device (e.g., X-ray or MRI systems), or mining operation drilling equipment. Each instance of a time series data set is recorded at a certain timestamp of an asset. An event is a failure case which happens at certain timestamps in an asset. A failure mode is a possible way or mode that a system might fail.

The following discussion is directed towards embodying implementations for industrial assets. However, the invention is not so limited, and it should be readily understood that other types and/or natures of assets are within the scope of this disclosure.

Embodying systems and methods provide a directional label rectification model that can identify the fault-relevant timestamps and features in a simultaneous approach. Unlike conventional graph-based label propagation models using fixed graphs, embodying techniques apply learning to learn an adaptive graph to create an optimal process for label rectification.

Conventional supervised learning approaches are incapable of achieving accurate results when faced with the absence of two pieces of critical information (i) at which timestamp(s) does the event signature(s) appear (e.g., labels); and (ii) which sensor data stream(s) (e.g., asset feature(s)) is relevant to the final failure. Without such information, conventional supervised learning practice is to natively labels the instances right before failure as "1" and the rest as "0". Then the conventional approaches seek to apply a discriminative rule in the input feature space. As described above, this approach fails in certain situations. In absence of failure signature timestamps, the label "1" is based on time adjacency, which can lead to labels that are of uncertain validity—with possibly many being mislabeled. For example, if all instances of monitored data in FIG. 1A that is within thirty days of the final failure are labeled as "1", a conventional supervised feature selection technique (e.g., random forest, lasso-based. mutual-information based, etc.) will fail, since only 10% of the instances are correctly labeled "1"—where the remaining 90% of the instances within thirty days should be properly treated as "0" (normal class).

Embodying systems and methods overcome these limitations of the prior art supervised methods by implementing Directional Label Rectification in Adaptive Graph (DRAG). In accordance with embodiments, improvements realized by DRAG include, but are not limited to, performing a directional label rectification algorithm that can automatically rectify the labels in $E_a$ to identify the truly failure-relevant instances (i.e., the failure-relevant instances having a correlation to the events) in the monitored data stream(s); and adaptively learning an optimal affinity matrix to represent the graph structure in label rectification. Embodying DRAG techniques are efficient, and scalable to accommodate large amounts of data.

In some implementations, concentration can be on one specific failure mode, with several events collected from one or multiple assets of like type and/or nature. Failure analysis can be done to identify the fault signature across these events, which indicates the unique feature patterns to distinguish failure events from the majority of fleet data.

Throughout this disclosure, unless otherwise specified, uppercase letters denote matrices, boldface lowercase letters denote vectors, and un-emphasized lowercase letters denote scalars. For a matrix $Z \in \mathbb{R}^{m \times m}$, $Z(i,:)$, $Z(:,j)$, and $Z(i,j)$ are used to denote its i-th row, j-th column, and ij-th element respectively.

The Frobenius norm of z is denoted as $$Z_F = \sqrt{\sum_{i,j} Z(i,j)^2} = \sqrt{tr(ZZ^T)},$$

and its $l_{2,1}$-norm as $$Z_{2,1} = \sum_{i=1}^{m} Z(i,:),$$

$$Z(i,:) = \sqrt{\sum_j Z(i,j)^2}$$

where is the $l_2$-norm of $Z(i,:)$. For a vector $\in^m$, its i-th element is denoted as $z_i$. $_m$ denotes an m×m identity matrix. 1 denotes a vector with all elements being 1.

Specially, $X=[_1, _2, \ldots, _n] \in \mathbb{R}^{m \times n}$ denotes input data, where m is the number of features and n is the number of instances. In a fleet level analysis, instances in X usually come from several different assets. The features in X may involve not only raw sensor recordings, but also time series features constructed with sliding-window based methods. With the time constraints incorporated in time series features, instances in X do not necessarily follow any specific time order.

Given an industrial asset event that causes a failure at a known timestamp, with certain domain knowledge it is reasonable to assume that the fault signature happens within a timestamps ahead of the failure (the initial assumption). Without loss of generality, input matrix X can be denoted as $X=[X_a, X_b]$:

where $X_a \in \mathbb{R}^{m \times a}$ represents the instances that appear within a timestamps before the failure (i.e., potentially relevant to failure); and $X_b \in \mathbb{R}^{m \times b}$ denotes all other instances considered to be normal (usually b>>a).

With fleet level multi-asset data, the above setting can be extended by concatenating all event instances, and normal instances, from different assets together in $X_a$ (and $X_b$). Suppose the data consists of k−1 event cases from a same failure mode. The initial event labels can be defined as $E=[E_a, E_b] \in \{0,1\}^{k \times n}$ based on the initial assumption. There is exactly one "1" in each column of E, showing the initial event label of each instance. Instances in $E_a$ have $E_a(j,i)=1$ for some j<k indicating that the i-th instance in $X_a$ is potentially relevant with the failure in j-th event. Meanwhile, all instances in $E_b$ have $E_b(k,i)=1$.

Embodying systems and methods implementing DRAG can automatically identify the feature pattern as well as the occurrence timestamps of the fault signature. Accordingly, it is possible to simultaneously select the features representing the signature and identify the subset of instances in $X_a$ that are truly relevant to failure.

In accordance with embodiments, DRAG addresses the problem of label uncertainty. Although most (if not all) the labels in $E_b$ can be trusted, the problem of label uncertainty cannot be treated as purely supervised, since labels in $E_a$ are mostly unreliable. If the conventional definition of unsupervised or semi-supervised frameworks is used (i.e., and simply ignore the labels in $E_a$), the potential label information from the initial assumption is lost. Embodying approaches provide a model capable of handling this situation.

In accordance with embodiments, the model can select important features for fault signature, and rectify the labels of $E_a$ in an automatic approach. This can be achieved by learning a weight matrix $W \in \mathbb{R}^{m \times k}$, and a label matrix $Y=[Y_a, Y_b] \in \mathbb{R}^{k \times n}$. The values in W show the contribution of features, where the subset of features with the largest weights naturally characterize the signature. Label matrix Y indicates the label probability distribution, where the instances with larger probability value on the j-th row of Y (j<k) can be recognized as relevant with the failure of the j-th event.

The feature selection task can be formulated with respect to the weight matrix W as the following problem:

$$\min_W \|W^T X - Y\|_F^2 + \alpha \|W\|_{2,1}, \quad (EQ.\ 1)$$

Where the regularization term $\|W\|_{2,1}$ imposes structured sparsity on the weight matrix W.

Label rectification for instances in $X_a$ can be based on label propagation in graph-based semi-supervised frameworks. By way of example, suppose a given set of partially labeled data $X=[1, 2, \ldots, n] \in \mathbb{R}^{m \times n}$ and an affinity matrix $\tilde{S} \in \mathbb{R}^{n \times n}$. The entries in $\tilde{S}$ indicate the pairwise affinity between corresponding instance pairs, where a larger $\tilde{S}(i,j)$ value corresponds to a higher affinity between i and j. Expectations are to learn the label matrix $Y \in \mathbb{R}^{k \times n}$, such that instances that are close to each other tend to have similar labels. This problem can be formulates as the minimization of the quadratic energy function:

$$\min_Y \sum_{i,j} \tilde{S}(i,j) \|Y(:,i) - Y(:,j)\|^2. \quad (EQ.\ 2)$$

$X_b$ can be treated as labeled and Eq. 2 can be adopted to learn the labels for $X_a$. Embodying systems and methods incorporate three major differences from conventional approaches:
- Instances in $X_a$ are not totally unlabeled and are usually collected from different events. Different events may have different patterns. This information is integrated in $E_a$ so as to avoid mislabeling a potential failure instance from one event to another event.
- A "directional" label rectification is expected where labels of $X_a$ are determined according to the affinity with $X_b$. Label propagation within $X_a$ is precluded, since over 90% of the labels in $E_a$ could be misleading in real fleet-level analysis. Instead of $\tilde{S}$, embodying systems and methods use a much smaller affinity matrix $S \in \mathbb{R}^{a \times b}$, which represents the affinity between instances in $X_a$ and $X_b$, in our label rectification.
- In most conventional frameworks, the affinity matrix S is predefined, thus the conventional label propagation approach is sensitive and dependent on the quality of the input graph. Moreover, as S is constructed in the original feature space, it is not appropriate in embodying systems and methods to propagate the labels in a subspace of selected features. Rather embodying systems and methods adaptively learn an optimal graph to represent the pairwise affinity in the selected feature space.

In accordance with embodiments, the three needs listed above are addressed by considering the following problem for label rectification:

$$\min_{S,Y} \|S - X_a^T X_{bF}\|^2 + \mu \|Y_a - E_{aF}\|^2 + \quad (EQ.\ 3)$$
$$\beta \sum_{i,j} S(i,j) \|Y_a(:,i) - E_b(:,j)\|^2,$$

s.t. $Y =, Y_b = E_b, S^T =, S \geq 0$.

Where, S is optimized, and thus is more adaptive for label rectification.

In EQ. 3, the term $\|S - X_a^T X_{bF}\|^2$ is included such that S cannot be too different from the graph on the original features, thus avoiding any abnormal structure in the learned S. The constraint Y=is involved to let Y encode the label probability distribution.

An embodying DRAG model is optimized by combining EQ. 1 and EQ. 3 to arrive at the following objective function:

$$(W, S, Y) = \min_{W,S,Y} \|W^T X - Y\|_F^2 + \alpha \|W\|_{2,1} + \gamma \|S - \quad (EQ.\ 4)$$
$$X_a^T X_{bF}\|^2 + \beta \sum_{i,j} S(i,j) \|Y_a(:,i) - E_b(:,j)\|^2 + \mu \|Y_a - E_{aF}\|^2,$$

s.t. $Y =, Y_b = E_b, S^T =, S \geq 0$.

In accordance with embodiments, DRAG provides an alternating optimization (AO) algorithm that implements EQ. 4. The AO algorithm can be employed, which iteratively minimizes the problem over each variable.

The AO algorithm can provide alternate approaches. First, knowing Y (label matrix) and S (affinity matrix), implementations of AO algorithm can optimize W (weight matrix). Second, knowing Y (label matrix) and W (weight matrix), implementations of AO algorithm can optimize S (affinity matrix).

In the first approach, given Y and S, optimize W. Accordingly, the objective function with respect to W becomes:

$$\min_W \|W^T X - Y\|_F^2 + \alpha \|W\|_{2,1}. \quad (EQ.\ 5)$$

The cost function in EQ. 5 is convex in W. In accordance with embodiments, W can be updated by taking derivative of the function with respect to W and set it to 0, which yields the following:

$$W = (XX^T - \alpha B_W)^{-1} XY^T, \quad (EQ.\ 6)$$

Where $B_W$ is a diagonal matrix with the i-th diagonal element as $$B_W(i,i) = \frac{1}{2\|W(i,:)\|}.$$

In the second approach, given Y and W, optimize S. The objective function with respect to S can be written as:

$$\min_{S^T=,S\geq 0} \gamma \|S - X_a^T X_{bF}\|^2 + \beta \sum_{i,j} S(i,j) \|Y_a(:,i) - E_b(:,j)\|^2. \quad (EQ.\ 7)$$

Equation 7 can be decomposed into several independent subproblems with respect to each column of S as follows:

$$\min_{S(:,j)^T=1, S(:,j) \geq 0} \|S(:,j) - P(:,j)\|^2, \quad (EQ.\ 8)$$

Where $$P(i, j) = X_a(:, i)^T X_b(:, j) - \frac{\beta\, Y_a(:, i) - E_b(:, j)^2}{2\gamma}.$$

The term $S(:,j)$ of EQ. 8 can be updated by applying the following:

$$\min_{u^T 1=1, u \geq 0} \frac{1}{2}\|u - v\|^2 \qquad \text{(EQ. 9)}$$

Given any $v \in \mathbb{R}^a$, the solution to the problem expressed in equation 9 can be formulated as $u_i = \max(v_i + \lambda^*, 0)$ with $\lambda^*$ satisfying $$\sum_{i=1}^{a} \max(v_i + \lambda^*, 0) = 1.$$

Without loss of generity, suppose the entries in v are listed in the descending order, i.e., $v_1 \geq v_2 \geq K \geq v_a$, and we have some $d \leq a$ satisfying $$\begin{cases} v_d + \lambda^* \geq 0 \\ v_{d+1} + \lambda^* < 0 \end{cases}. \qquad \text{(EQ. 10)}$$

From the constraint $$\sum_{i=1}^{a} \max(v_i + \lambda^*, 0) = 1,$$

we can infer $$\lambda^* = \frac{1}{d}\left(1 - \sum_{i=1}^{d} v_i\right). \qquad \text{(EQ. 11)}$$

The result of substituting equation 11 into equation 10 is:

$$\begin{cases} \sum_{i=1}^{d}(v_i - v_d) \leq 1 \\ \sum_{i=1}^{d+1}(v_i - v_{d+1}) > 1 \end{cases},$$

thus $d = \max\left\{l \,\Big|\, \sum_{i=1}^{l}(v_i - v_l) \leq 1\right\}$.

Given W and S, optimize Y. With the constraint $Y_b = E_b$, the problem of updating Y can be derived to be equivalent to optimizing the following objective with respect to $Y_a$:

$$\min_{Y_a^T 1=1} \|Y_a - W^T X_a\|_F^2 + \mu\|Y_a - E_a\|_F^2 + \qquad \text{(EQ. 12)}$$

-continued $$\beta \sum_{i,j} S(i, j)\|Y_a(:, i) - E_b(:, j)\|^2.$$

Let D be a diagonal matrix with the i-th diagonal element as $$D(i, i) = \sum_j S(i, j),$$

then the Lagrangian function of equation 12 can be expressed as:

$$(Y_a, \eta) = Y_a - W^T X_{aF}^2 + \mu Y_a - E_{aF}^2 + \beta(Y_a D Y_a^T) - 2\beta(Y_a S - E_b^T) + \eta^T(Y_a^T -). \qquad \text{(EQ. 13)}$$

Taking the derivative of equation 13 with respect to $Y_a$ and set it equal to zero, yields:

$$Y_a = (C - \tfrac{1}{2}\eta^T)((\mu+1)_a - \beta D)^{-1},$$

Where $C = W^T X_a + \mu E_a + \beta E_b S^T$. (EQ. 14)

Substitution of the constraint $Y_a^T = 1$ into the solution of equation 14 results in $$\eta = \frac{2}{k}(C^T - (\mu+1)\mathbb{1}_a - \beta D)1. \qquad \text{(EQ. 15)}$$

Thus, $$Y_a = \left(C - \frac{11^T}{k}C\right)((\mu+1)\mathbb{1}_a + \beta D)^{-1} + \frac{11^T}{k}$$

The steps for the DRAG AO algorithm is summarized in Algorithm I.

Input: X, E, α, β, μ, γ.
  $X^- = [X_a, X_b] \in \mathbb{R}^{m \times n}$ where n is the number of instances and m is the number of features, while $X_a \in \mathbb{R}^{m \times a}$ contains the instances initially labeled as event instances and $X_b \in \mathbb{R}^{m \times b}$ are those initially labeled as normal (usually b>>a).
  $E = [E_a, E_b] \in \mathbb{R}^{b \times n}$ are the initial event labels, where $E(j,i) = 1$ with j<k if $x_i$ is initialized as the j-th event, otherwise $E(k,i) = 1$
Output: Feature weight $W \in \mathbb{R}^{m \times k}$, learned affinity matrix $S \in \mathbb{R}^{a \times b}$, and instance label distribution $Y \in \mathbb{R}^{k \times n}$.
  Initialize Y=E and $Y_a$ to be the first a columns of Y:
  Initialize $B_W = \mathbb{I}_m$;
while Not convergent do
  Update W with $W = (XX^T + \alpha B_W)^{-1} XY^T$, (Eq. 6)
  Update S according to Eqs. (9-11)
  Update Y such that $Y_b = E_b$ and $$Y_a = (C - \tfrac{1}{2}\eta^T)((\mu+1)_a + \beta D)^{-1}, \qquad \text{(Eq. 14)}$$

end while.

Algorithm I

Embodying approaches solve problems having the following aspects: (1) two kinds of output: instance weights (for $X_a$) and feature weights with very rough labels in the beginning; (2) fleet level modeling (not just a single asset) of time series data for both event and healthy assets; and (3) focus on one specific failure mode with k (k≥1) event cases, where each event has an independent view of feature and/or instance weight.

Instance weighting of an event reflects the timestamp of an event in relation to when a failure occurred (e.g., the closer in time an event occurs to a failure, the greater its instance weight). Feature weighing reflects the relative contribution of a particular feature in relation to the nature of the failure (e.g., oil level sensor data could have more weighting in a seized engine than a vibration sensor data; conversely, vibration data could be more significant in a cracked rotor scenario).

Conventional approaches to time series anomaly detection can be built upon auto-regression techniques (e.g., autoregressive integrated moving average (ARIMA), vector auto-regression (VAR), and the like). Conventional approaches can rank causal anomaly detection based on vanishing correlations on sensor graphs, which also has the capability of root cause analysis by fault propagation. However, these conventional approaches are premised on the assumption that there exists an invariant network on sensors/features. Such an assumption is simply not valid in in many real world problems, where the normal data contains several different patterns and the underlying distribution changes over time. Furthermore, conventional methods can only model a single asset. Embodying systems and methods implement a multi-agent modeling toolkit (MAMT) that can address dynamic patterns in the normal set $(X_b)$, and it is capable of building one single model on multiple assets.

Embodying systems and method provide a directional label rectification model with adaptive graph for failure analysis in multivariate time-series data. In accordance with embodiments, the label uncertainty problem is addressed by dynamically rectifying the initial event labels according to the affinity with normal instances. Unlike conventional methods that use a fixed graph as input, embodiments adaptively learn an optimal affinity matrix to represent the graph structure in the subspace of selected features. Embodying models are effective in simultaneously selecting failure-relevant features and instances.

Figure 2:
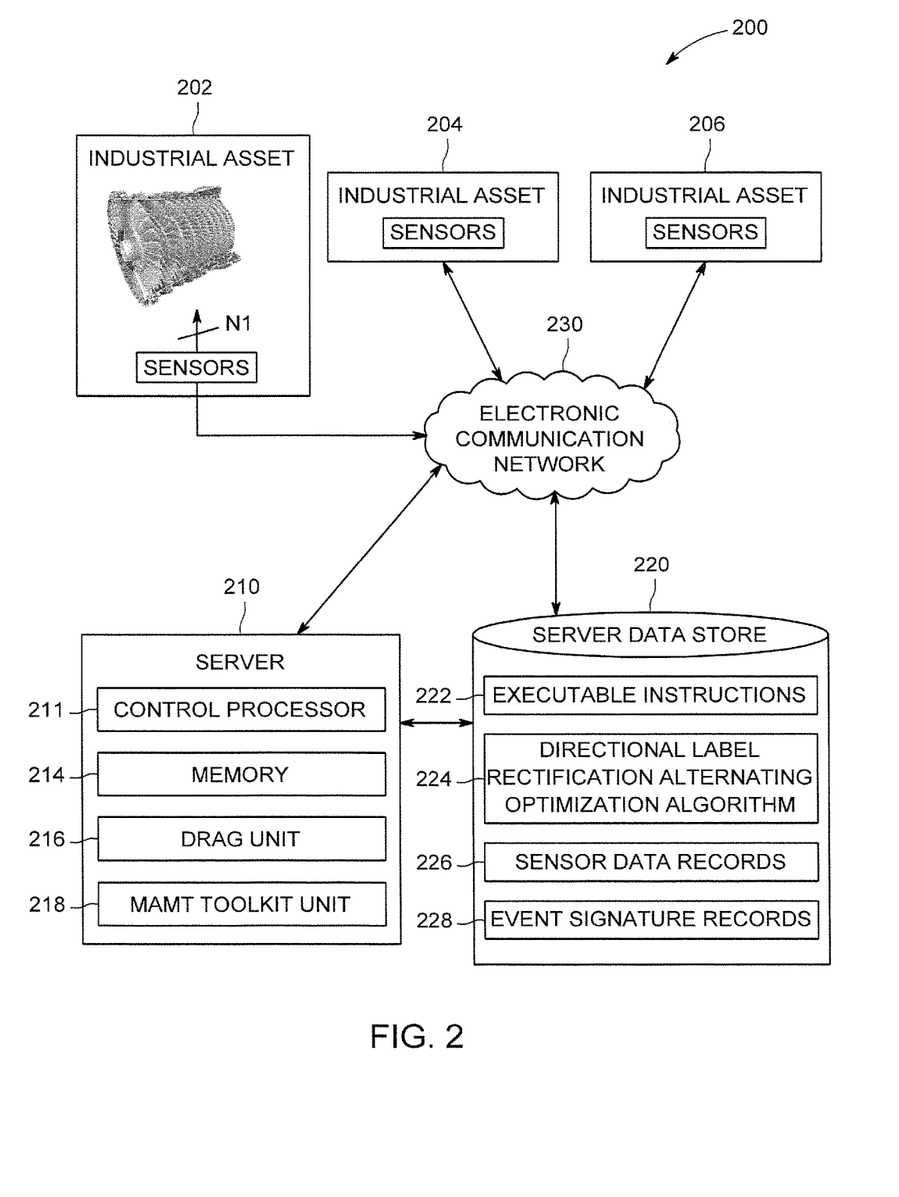
FIG. 2 depicts a system for directional label rectification for failure analysis in multivariate time-series data in accordance with embodiments.

FIG. 2 depicts system 200 for implementing directional label rectification for failure analysis in multivariate time-series data in accordance with embodiments. System 200 can include one or more industrial assets 202, 204, 206, where industrial asset 202 is illustrated as a turbine. Each industrial asset can include one or more sensors (e.g., quantity N1) that monitor various operational status parameters of operation for the industrial asset. The quantity of sensors, the parameter monitored, and other factors can vary dependent on the type and nature of the industrial asset itself. For example for a turbine engine, sensors can monitor turbine vane wear, fuel mixture, power output, temperature(s), pressure(s), etc. It should be readily understood that system 200 can include multiple monitored industrial assets of any type and nature. Further, embodying systems and methods can be implemented regardless of the number of sensors, quantity of data, and format of information received from monitored industrial assets. Each industrial asset can be in communication with other devices across electronic communication network 230.

Server 210 can include at least one server control processor 211 configured to support embodying DRAG approaches to analyze sensor data to determine failure and event signature(s) in multivariate time-series data by executing executable instructions 222 accessible by the server control processor from server data store 220. The server can include memory 214 for, among reasons, local cache purposes.

In accordance with embodiments, server 210 can be in communication with the data store across electronic communication network 230, and/or in direct communication. Server 210 can access sensor data records 226 from server data store 220. Sensor data records 226 can include multivariate time series sensor data obtained from each respective industrial asset. DRAG unit 216 can implement directional label rectification alternating optimization algorithm 224 to perform the failure and event signature(s) analysis discussed above. Event signature records 228 can contain the resulting event signature patterns.

In accordance with embodiments, MAMT toolkit unit 218 can address dynamic patterns in an input data matrix (e.g., normal set $(X_b)$). The MAMT toolkit unit can build one single model from sensor data received from multiple assets of the same type and nature.

Electronic communication network can be, can comprise, or can be part of, a private internet protocol (IP) network, the Internet, an integrated services digital network (ISDN), frame relay connections, a modem connected to a phone line, a public switched telephone network (PSTN), a public or private data network, a local area network (LAN), a metropolitan area network (MAN), a wide area network (WAN), a wireline or wireless network, a local, regional, or global communication network, an enterprise intranet, any combination of the preceding, and/or any other suitable communication means. It should be recognized that techniques and systems disclosed herein are not limited by the nature of network 230.

Each industrial asset 202, 204, 206 can be in communication with server data store 220 across electronic communication network 230, The industrial assets provide sensor data, which is stored in sensor data records 226.

The analysis performed by embodying systems and processes can determine the event(s) that lead to failure(s) of one or more features of an industrial asset. In some implementations, for example, the result of the analysis can be determinative in whether maintenance and/or inspection activity should be performed. This determination can be based on pattern recognition techniques applied to historical event signatures that were previously determined and then stored in event signature records 228.

Figure 3:
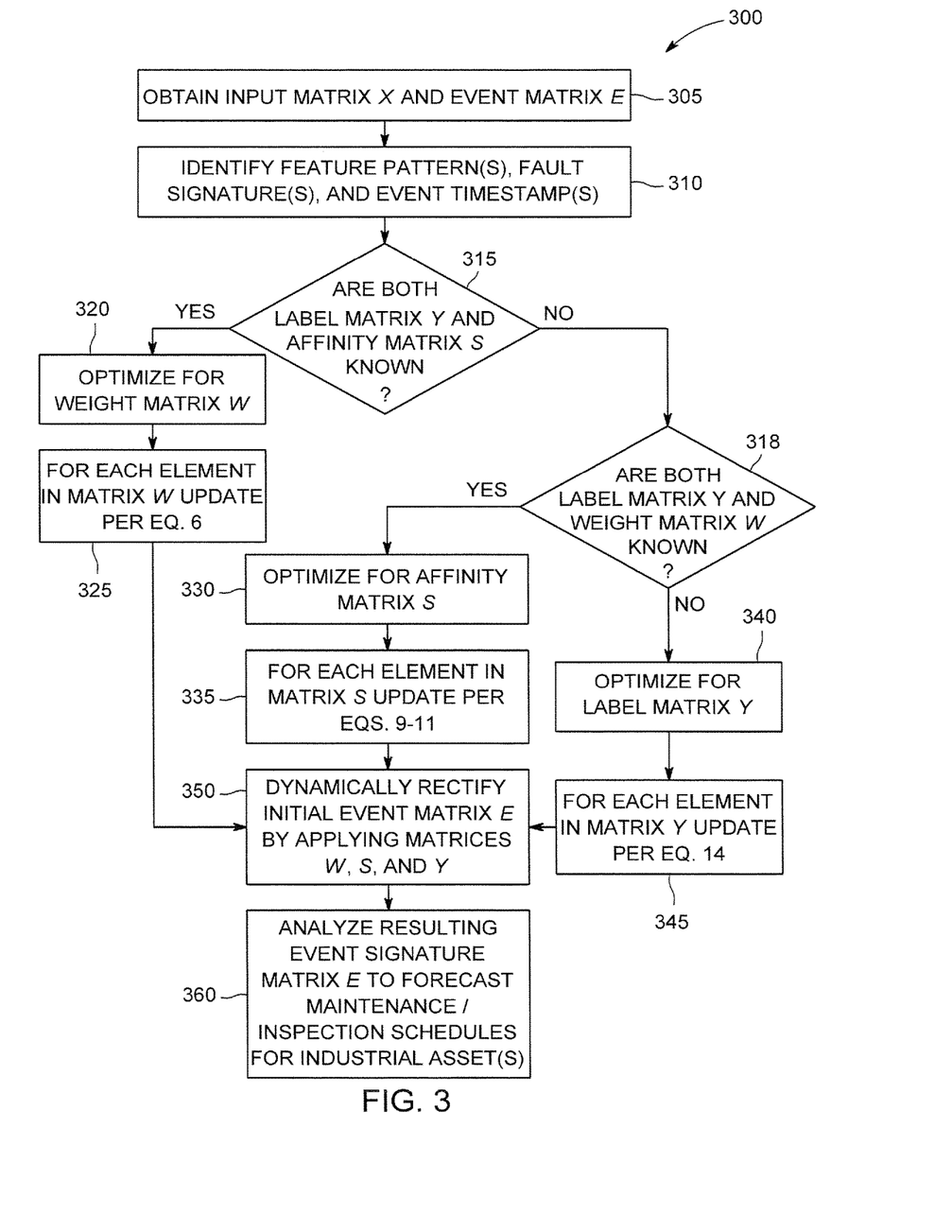
FIG. 3 depicts a process flowchart for directional label rectification for failure analysis in multivariate time-series data in accordance with embodiments.

FIG. 3 depicts a flowchart for process 300 to implement directional label rectification for failure analysis in multivariate time-series data in accordance with embodiments. An input matrix X and an event matrix X are obtained, step 305. The input matrix can contain sensor readings for one or more features of a monitored industrial asset, along with timestamp data identifying when each sensor reading was recorded. The event matrix can contain failure event information of the industrial asset being monitored. From the recorded sensor data, patterns in the monitored industrial asset features can be identified, step 310. Fault signature(s) and event timestamp(s) can also be identified at step 310.

A determination is made as to whether both label matrix Y and affinity matrix S are known, step 315. If one of matrices Y or S is not known, process 300 then makes a determination as to whether both label matrix Y and weight matrix W are known, step 318.

If both label matrix Y and affinity matrix S are known (step 315), then process 300 performs an optimization for weight matrix W, step 320. Optimization of matrix W is performed for each element per EQ. 6, step 325. With weight matrix W optimized, the initial event matrix E can be dynamically rectified by applying matrices W, S, and Y, step 350.

If at step 318, both label matrix Y and weight matrix W are known, then process 300 performs an optimization for affinity matrix S, step 330. Optimization of affinity matrix S is performed for each element per EQS. 9-11, step 335. With affinity matrix S optimized, the initial event matrix E can be dynamically rectified by applying matrices W, S, and Y, step 350.

If at step 318, one of label matrix Y and weight matrix W are not known (logically indicating that label matrix Y is unknown, then process 300 performs an optimization for label matrix Y, step 340. Optimization of label matrix Y is performed for each element per EQ. 14, step 345. With label matrix Y optimized, the initial event matrix E can be dynamically rectified by applying matrices W, S, and Y, step 350.

The rectified event matrix E is analyzed, step 360, to forecast maintenance and/or inspection schedules for the monitored industrial asset, and other industrial assets of similar type and/or nature. This rectified matrix E can be stored in event signature records 228.

In accordance with some embodiments, a computer program application stored in non-volatile memory or computer-readable medium (e.g., register memory, processor cache, RAM, ROM, hard drive, flash memory, CD ROM, magnetic media, etc.) may include code or executable instructions that when executed may instruct and/or cause a controller or processor to perform a method of directional label rectification with adaptive graph for failure analysis in multivariate time-series data, as disclosed above.

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

We claim:

1. A method of directional label rectification with adaptive graph for multivariate time-series data, the method comprising:
    obtaining an input matrix containing sensor data, the sensor data representing monitored time-series data of one or more features of an asset;
    obtaining a first event matrix containing event data, the event data containing failure event information corresponding to respective ones of the one or more features;
    identifying in the input matrix at least one feature pattern and a first corresponding time stamp;
    identifying in the first event matrix at least one fault signature and a second corresponding time stamp;
    if both a label matrix and an affinity matrix are known, then optimizing a weight matrix,
    else if both the label matrix and the weight matrix are known, then optimizing the affinity matrix,
    else optimizing the label matrix;
    creating a dynamically rectified event matrix by applying the label matrix, the affinity matrix, and the weight matrix to the first event matrix; and
    applying the dynamically rectified event matrix to forecast a future status of the asset.

2. The method of claim 1, wherein the asset is an industrial asset, the forecast including at least one of a maintenance schedule and an inspection schedule for the industrial asset.

3. The method of claim 1, creating the dynamically rectified event matrix including identifying failure-relevant instances in the input matrix.

4. The method of claim 3, including:
    correlating identified failure-relevant events from two or more monitored data streams collected from multiple assets;
    determining one or more unique feature patterns in the correlated identified failure-relevant events; and
    applying the one or more unique feature patterns to identify failure event patterns across a fleet of assets.

5. The method of claim 1, the input matrix including at least one of raw sensor recordings and time-series features constructed with a sliding-window time base.

6. A non-transitory computer readable medium having stored thereon instructions which when executed by a control processor cause the control processor to perform a method of directional label rectification with adaptive graph for multivariate time-series data, the method comprising:
    obtaining an input matrix containing sensor data, the sensor data representing monitored time-series data of one or more features of an asset;
    obtaining a first event matrix containing event data, the event data containing failure event information corresponding to respective ones of the one or more features;
    identifying in the input matrix at least one feature pattern and a first corresponding time stamp;
    identifying in the first event matrix at least one fault signature and a second corresponding time stamp;
    if both a label matrix and an affinity matrix are known, then optimizing a weight matrix,
    else if both the label matrix and the weight matrix are known, then optimizing the affinity matrix,
    else optimizing the label matrix;
    creating a dynamically rectified event matrix by applying the label matrix, the affinity matrix, and the weight matrix to the first event matrix; and
    applying the dynamically rectified event matrix to forecast a future status of the asset.

7. The medium of claim 6, wherein the asset is an industrial asset, the medium containing computer-readable instructions stored therein to cause the control processor to perform the method by including in the forecast at least one of a maintenance schedule and an inspection schedule for the industrial asset.

8. The medium of claim 6 containing computer-readable instructions stored therein to cause the control processor to perform the method, including creating the dynamically rectified event matrix by identifying failure-relevant instances in the input matrix.

9. The medium of claim 8 containing computer-readable instructions stored therein to cause the control processor to perform the method, including:
    correlating identified failure-relevant events from two or more monitored data streams collected from multiple assets;
    determining one or more unique feature patterns in the correlated identified failure-relevant events; and applying the one or more unique feature patterns to identify failure event patterns across a fleet of assets.

10. The medium of claim 6 containing computer-readable instructions stored therein to cause the control processor to perform the method, the input matrix including at least one of raw sensor recordings and time-series features constructed with a sliding-window time base.

11. A system for directional label rectification with adaptive graph for multivariate time-series data, the system comprising:
   a server including a control processor, the server in communication with a data store across an electronic communication network;
   the data store including sensor data records, the sensor data records including monitored data of one or more features of at least one asset;
   the data store including executable instructions, the executable instructions configured to cause the control processor to perform a method including:
   obtaining an input matrix containing sensor data, the sensor data representing monitored time-series data of one or more features of an asset;
   obtaining a first event matrix containing event data, the event data containing failure event information corresponding to respective ones of the one or more features;
   identifying in the input matrix at least one feature pattern and a first corresponding time stamp;
   identifying in the first event matrix at least one fault signature and a second corresponding time stamp;
   if both a label matrix and an affinity matrix are known, then optimizing a weight matrix,
      else if both the label matrix and the weight matrix are known, then optimizing the affinity matrix,
      else optimizing the label matrix;
   creating a dynamically rectified event matrix by applying the label matrix, the affinity matrix, and the weight matrix to the first event matrix; and
   applying the dynamically rectified event matrix to forecast a future status of the asset.

12. The system of claim 11, wherein the asset is an industrial asset, the executable instructions configured to cause the control processor to perform the method by including in the forecast at least one of a maintenance schedule and an inspection schedule for the industrial asset.

13. The system of claim 11, the executable instructions configured to cause the control processor to perform the method, including creating the dynamically rectified event matrix by identifying failure-relevant instances in the input matrix.

14. The system of claim 13, the executable instructions configured to cause the control processor to perform the method, including:
   correlating identified failure-relevant events from two or more monitored data streams collected from multiple assets;
   determining one or more unique feature patterns in the correlated identified failure-relevant events; and
   applying the one or more unique feature patterns to identify failure event patterns across a fleet of assets.

15. The system of claim 11, the executable instructions configured to cause the control processor to perform the method, the input matrix including at least one of raw sensor recordings and time-series features constructed with a sliding-window time base.

* * * * *